Figure 1:
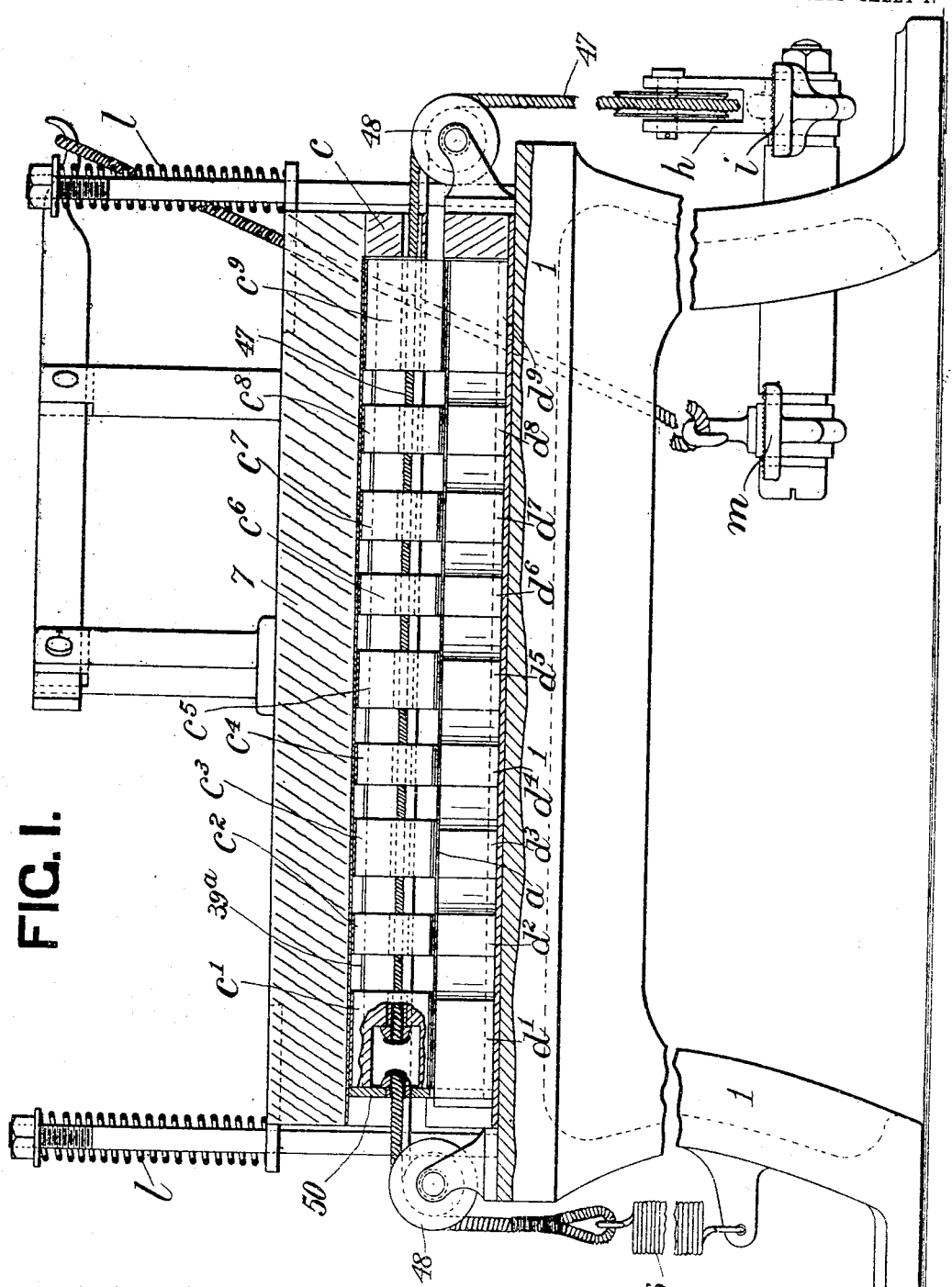

C. R. HEISER.
APPARATUS FOR PLAITING PAPER.
APPLICATION FILED OCT. 1, 1909.
957,159.
Patented May 3, 1910.
14 SHEETS—SHEET 5.
FIG. 6.
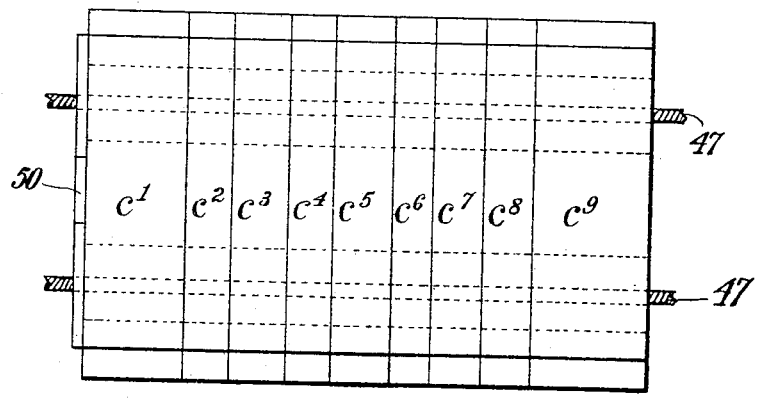
FIG. 7.
FIG. 8.
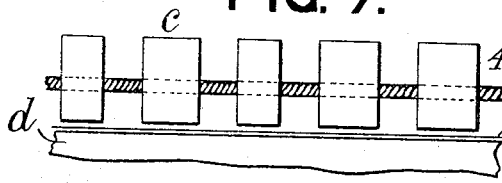
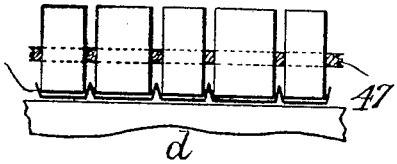
FIG. 9.
FIG. 10.
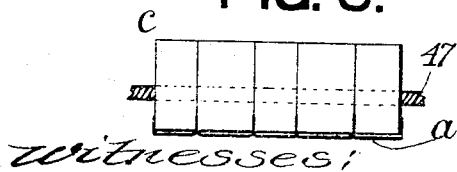
Witnesses:
Inventor
Christian R. Heiser
By
James L. Norris
Atty

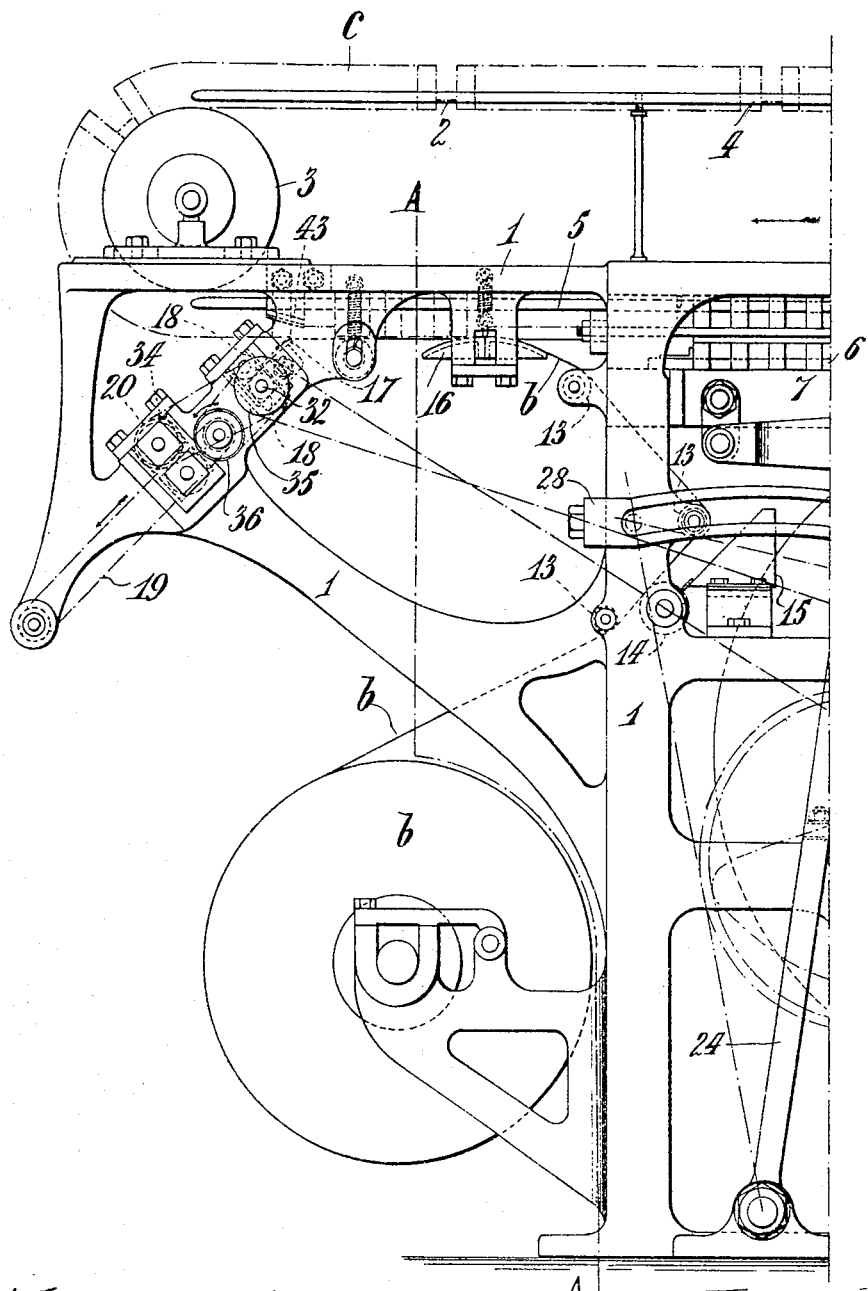

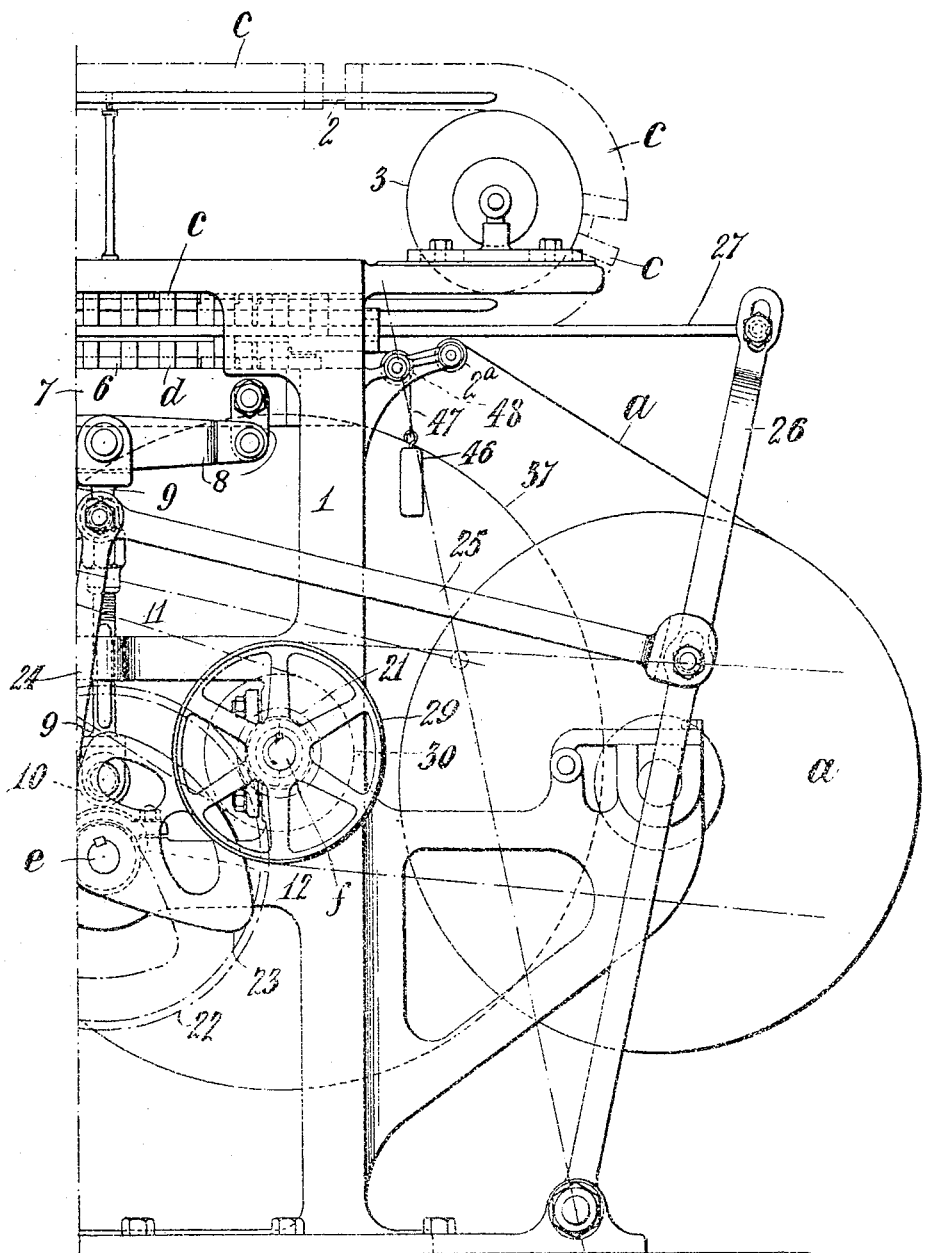

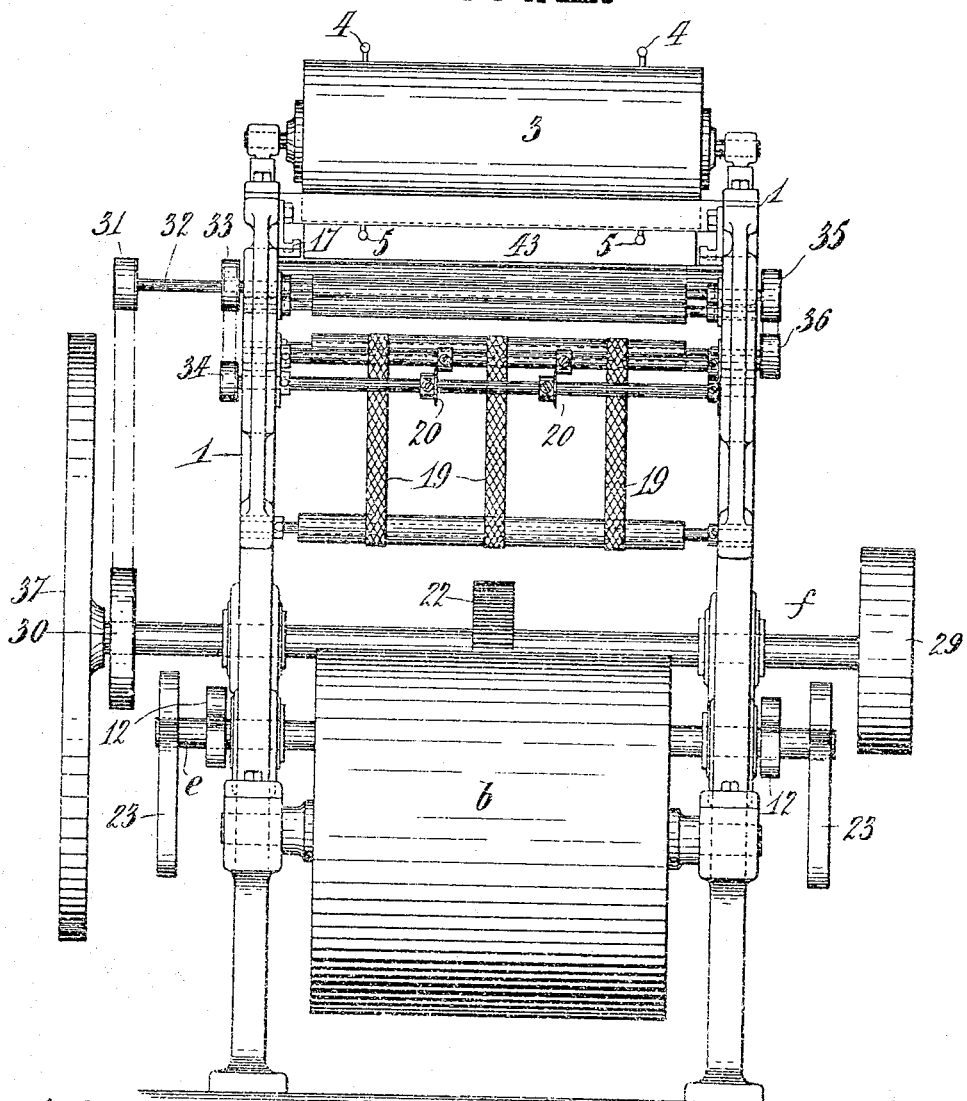

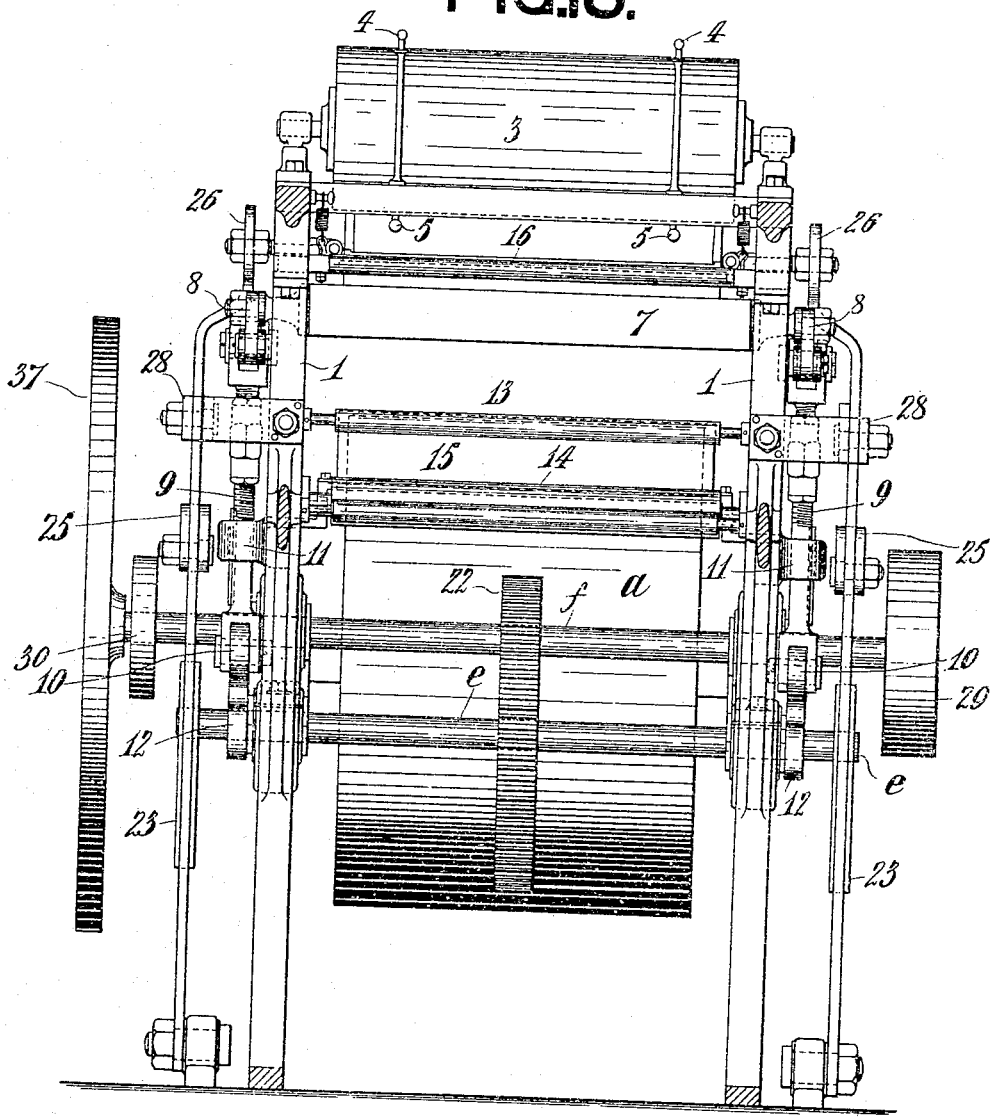

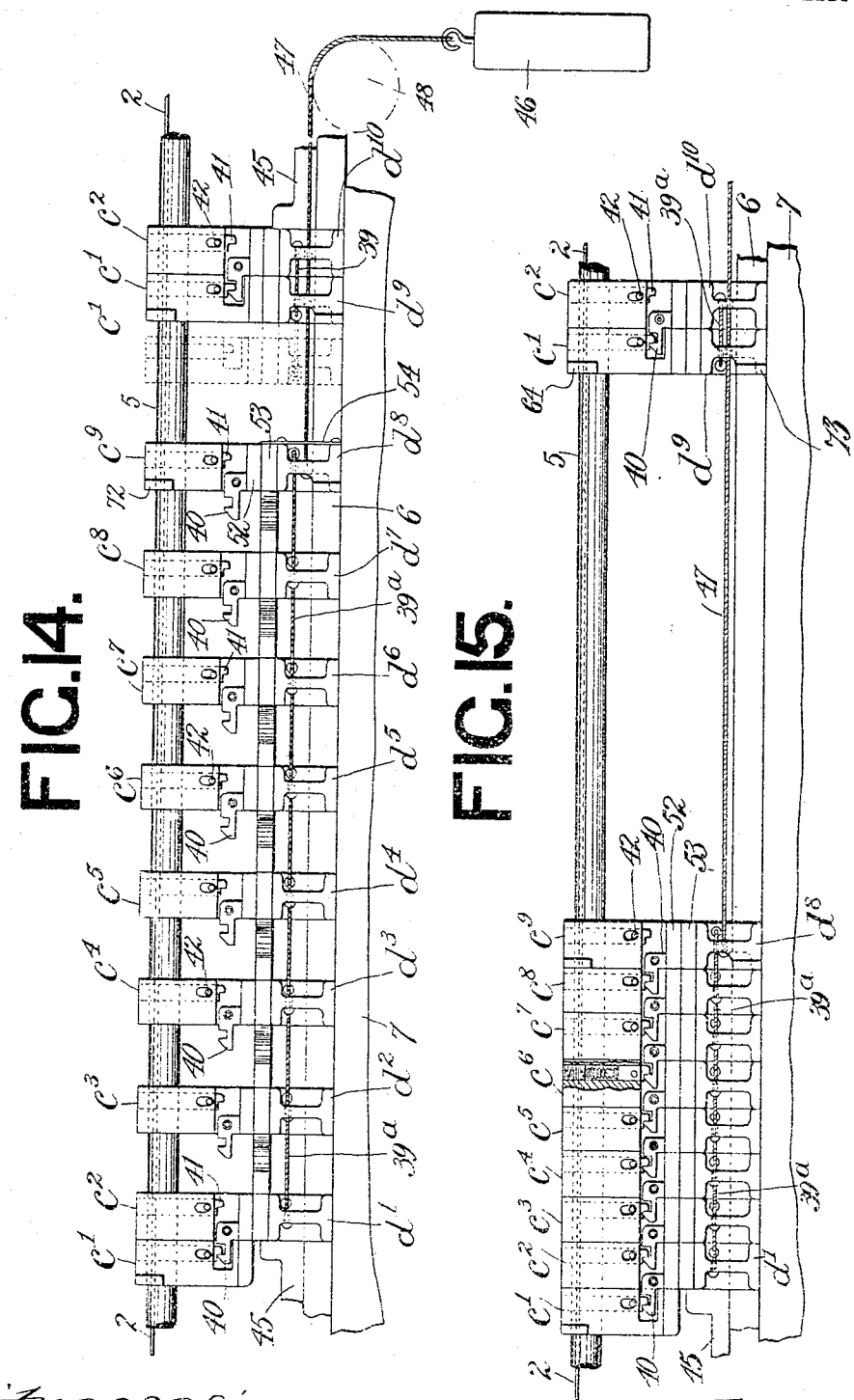

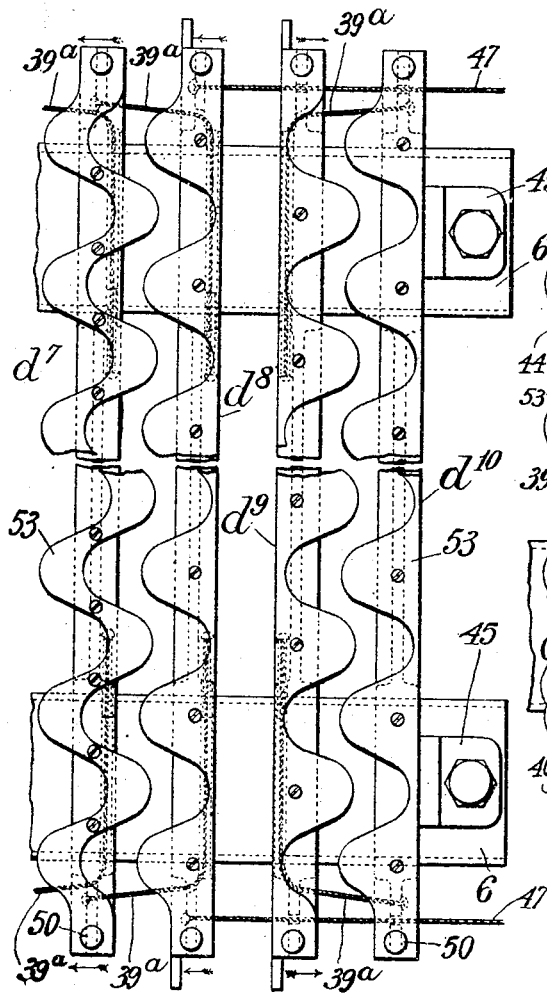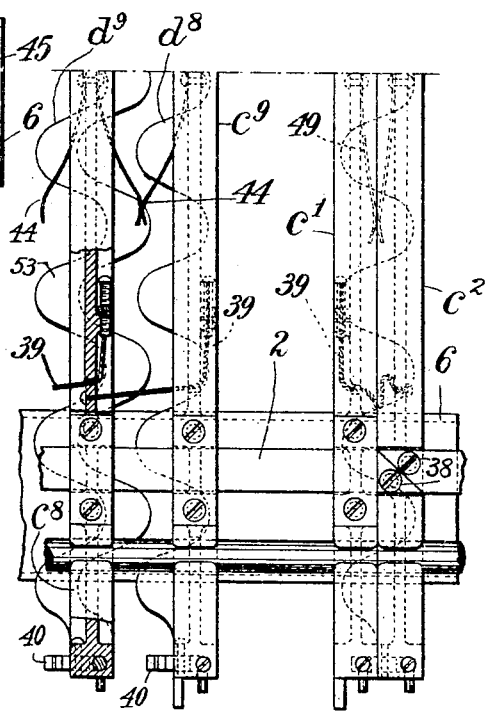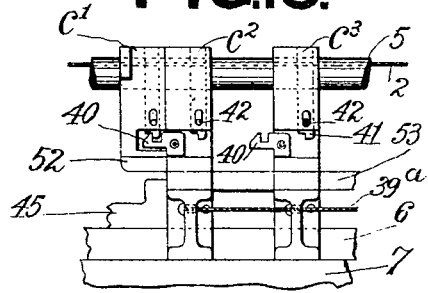

C. R. HEISER.
APPARATUS FOR PLAITING PAPER.
APPLICATION FILED OCT. 1, 1909.
957,159.
Patented May 3, 1910.
14 SHEETS—SHEET 12.
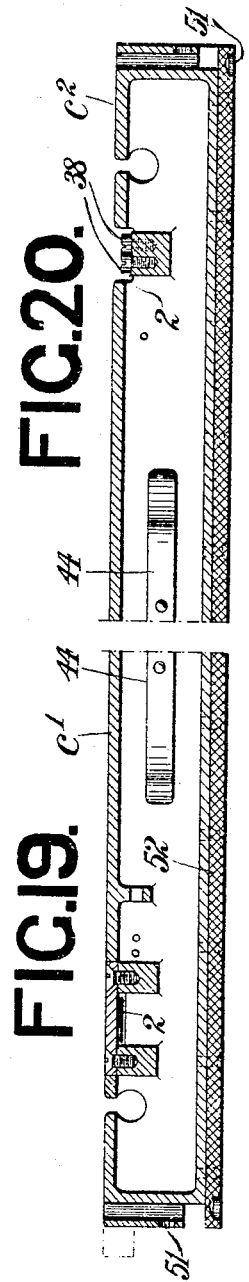
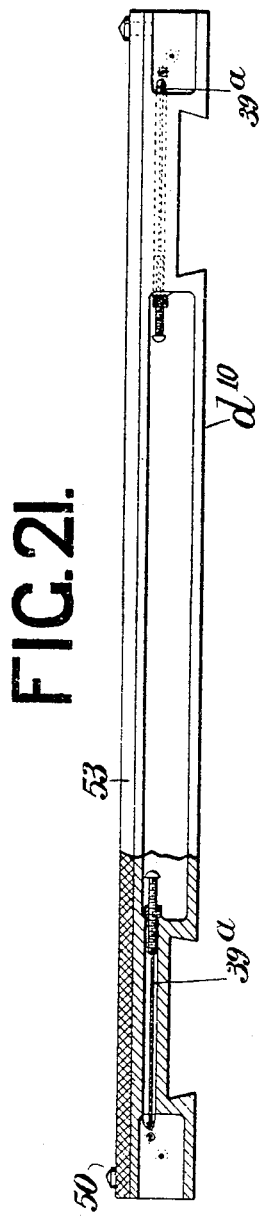
Witnesses
Inventor
Christian R. Heiser
By
James L. Norris
Atty C. R. HEISER.
APPARATUS FOR PLAITING PAPER.
APPLICATION FILED OCT. 1, 1909.
957,159.
Patented May 3, 1910.
14 SHEETS—SHEET 13.
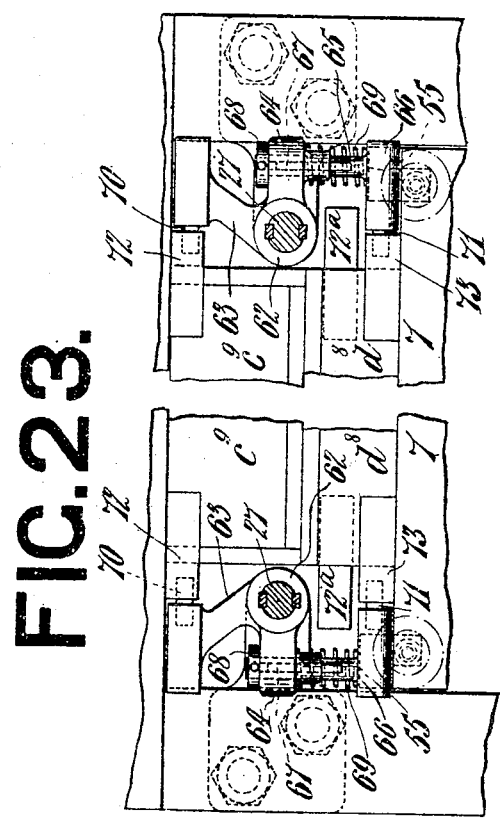
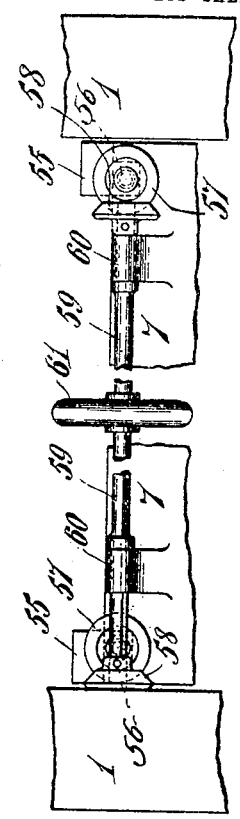
Witnesses:
Inventor
Christian R. Heiser
By James L. Norris
Atty

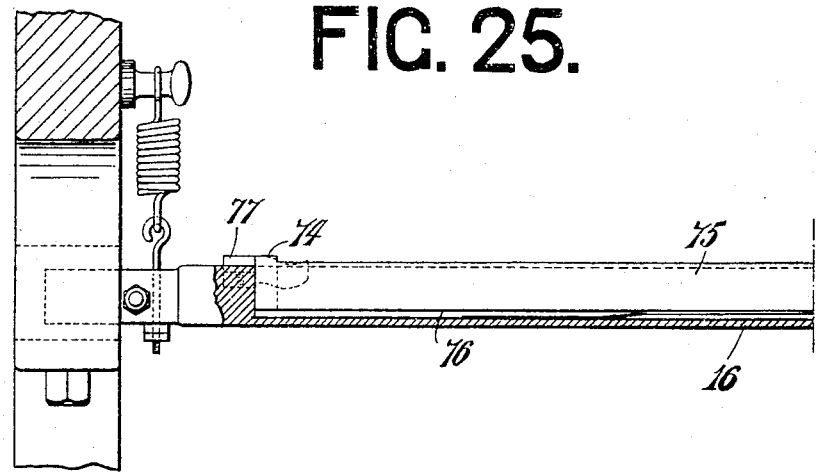
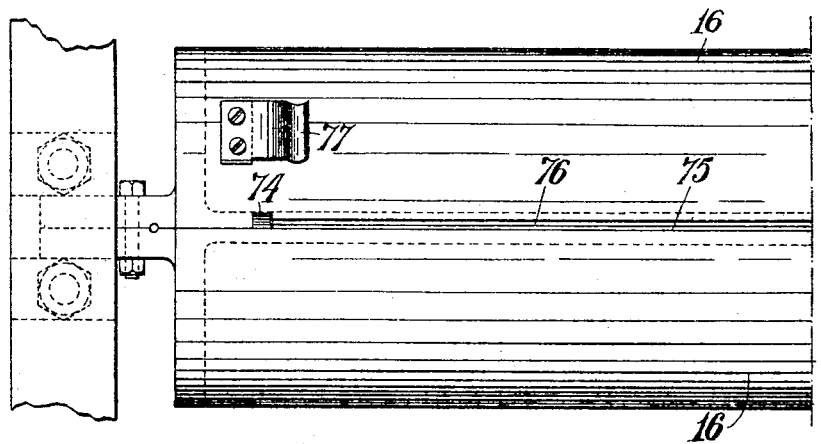
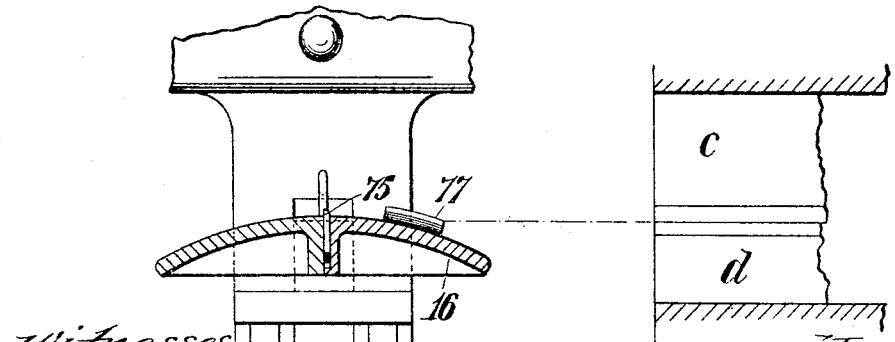

UNITED STATES PATENT OFFICE.

CHRISTIAN ROBERT HEISER, OF LONDON, ENGLAND.

APPARATUS FOR PLAITING PAPER.

957,159.  Specification of Letters Patent.  Patented May 3, 1910.

Application filed October 1, 1909. Serial No. 520,576.

*To all whom it may concern:*

Be it known that I, CHRISTIAN ROBERT HEISER, a subject of the King of Great Britain, residing at 72 Aldersgate street, in the city of London, England, printer, have invented certain new and useful Improvements in Apparatus for Plaiting Paper, of which the following is a specification.

This invention relates to the folding or plaiting of paper or other fabric, and the invention has for its object to provide an improved apparatus for the production of folded or plaited paper or other fabric for packing or other purposes with greater uniformity and with greater efficiency than heretofore.

It is well known to manufacture paper for packing or other purposes consisting of a sheet of corrugated paper to which is attached a sheet of plain paper, and also to attach retaining strips of plain paper or fabric to one side of a sheet of corrugated paper, said corrugated paper being produced by means of mutually engaging fluted rollers or by means of fluted rollers engaging correspondingly fluted traveling blocks, or by being drawn in close contact over a number of rods. Also it is common to produce cellular compound fabric by corrugating and pasting sheets of paper so that top and bottom plain sheets inclose a corrugated sheet. All these papers are, however, usually employed for wrapping around articles of a frangible nature, or to form sub-divisions between individual articles contained in packing cases and crates.

It is to be understood that the present invention relates to the manufacture of packing paper of an entirely different class and for a wholly different purpose to that above referred to, the paper in fact not being corrugated but being essentially folded or plaited, so as to form upstanding ribs or projections separated by plane areas of paper.

The invention is primarily designed to produce paper sheets for packing confectionery, cakes, bon-bons, fruit or other goods, in which a series of projections, folds or plaits, occurring at predetermined intervals serve to form divisions or partitions between successive rows of packed articles.

According to the invention the paper or other fabric may either be subjected to the necessary operations after having previously been reduced to sheets of the required dimensions, or, the production of the folded or plaited paper or other fabric may be effected from a continuous web of material.

When the paper or other fabric is already in the form of sheets, a sheet of the material is folded or plaited between two mutually opposed series of bars or blocks adapted to co-act with one another in such manner as to first grip predetermined areas of the sheet of material between them and to be thereafter traveled so as to cause the material intervening between said gripped parts and whereon no pressure is applied initially, to become folded or plaited at predetermined intervals. The bars of each of the aforesaid series are normally separated one from another a distance which represents twice the height or depth of the fold or plait formed in the material, or in other words, the measure of the material contained in each fold or plait, and said bars are adapted to be drawn together to fold and plait the paper.

For convenience in description one series of the aforesaid co-acting bars will be hereafter termed the "creaser" bars and the other series will be termed the "abutment" bars.

In the case where the production of the folded or plaited paper or other fabric is effected from a continuous web of material, the paper or other fabric is treated between an intermittently-driven endless band constituted by successive series of "creaser" bars or blocks whereof each series is adapted to co-act in succession with a mutually opposed series of "abutment" bars or blocks in such manner as to first grip predetermined areas of the length of the material and to be thereafter traveled in order to cause the paper or other fabric to become creased and folded or plaited, whereafter, if desired, an additional supporting or retaining sheet of paper or other fabric may be applied thereto in order to permanently retain the folds, plaits or projections after formation in their correct relative positions, and the finished paper or other fabric is then if desired reduced to the required dimensions.

The accompanying drawings illustrate the manner of carrying the invention into practical effect. Figures 1 to 10 showing a machine and details thereof for treating paper or other fabric already reduced to sheets, and Figs. 11 to 29 showing a machine and details thereof for operating upon paper or other fabric drawn from a continuous web.

Fig. 1 is a longitudinal sectional elevation.

Figure 2:
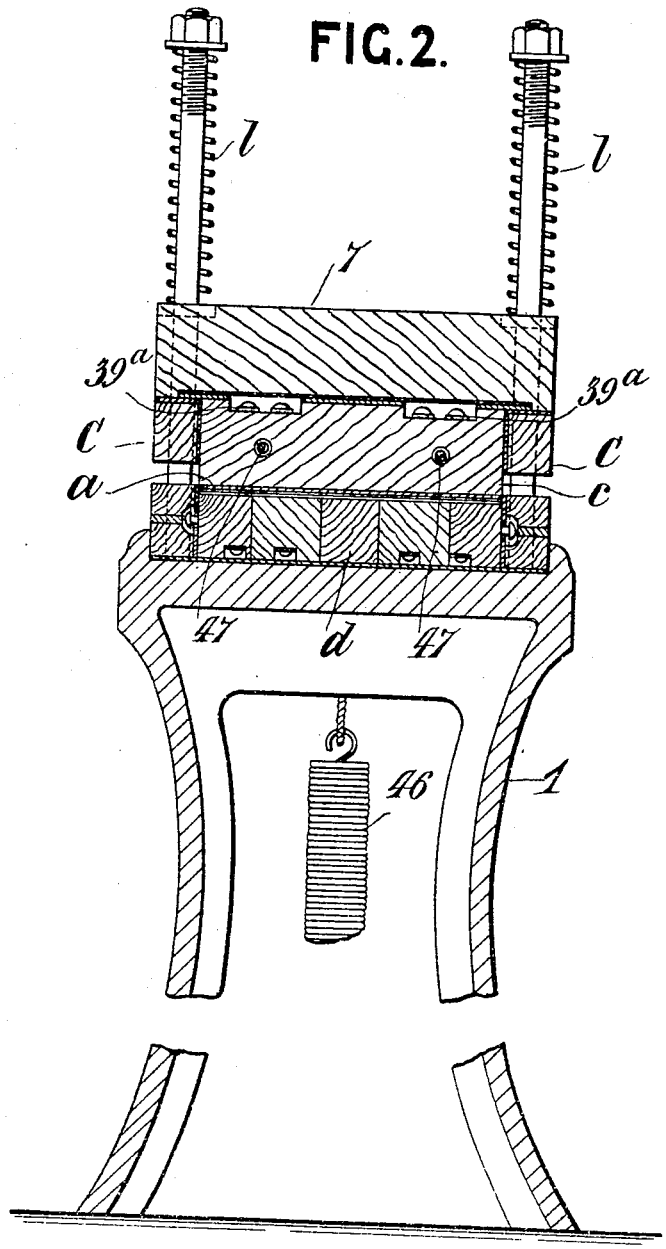
Figure 3:
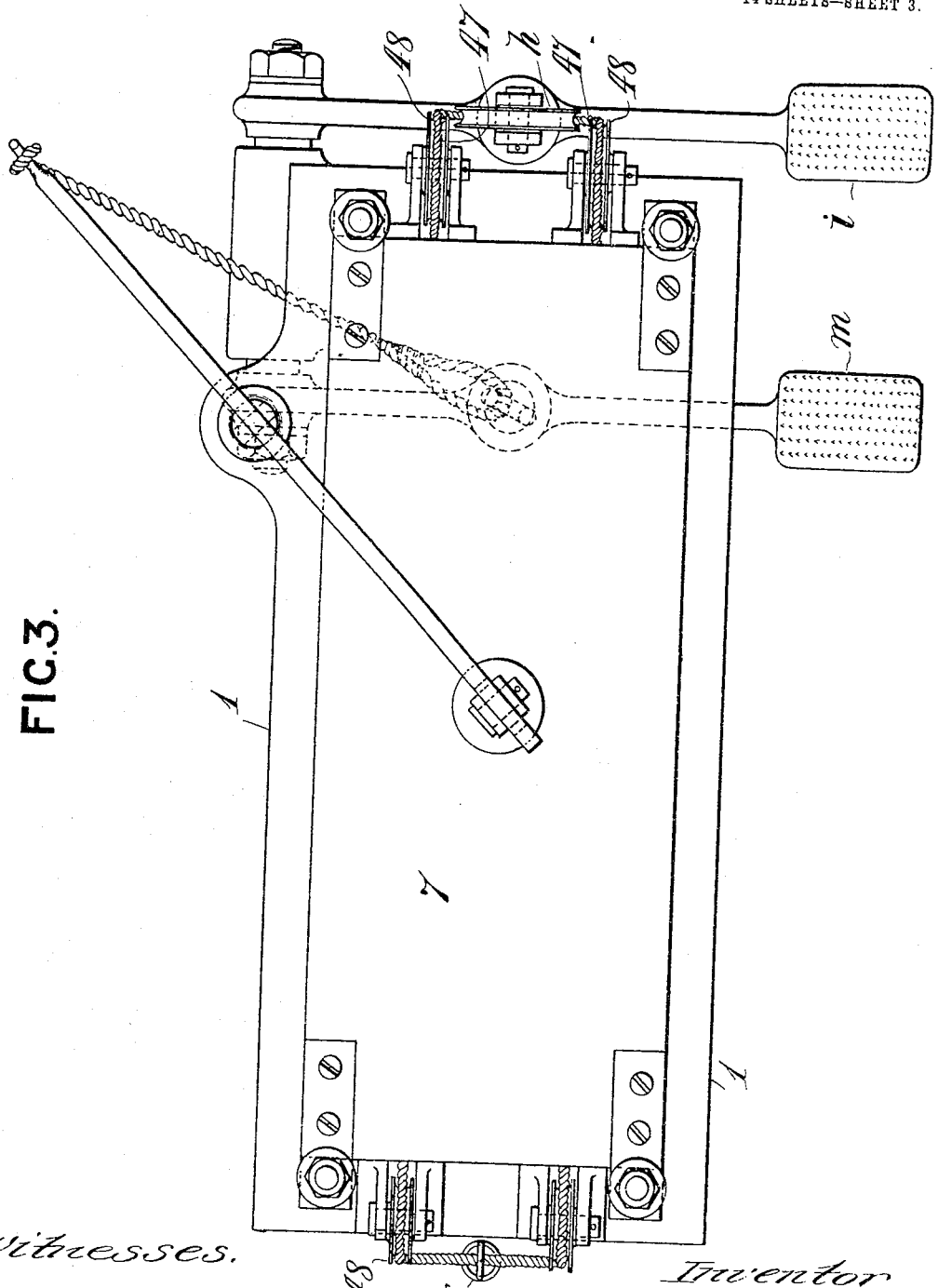
Figure 4:
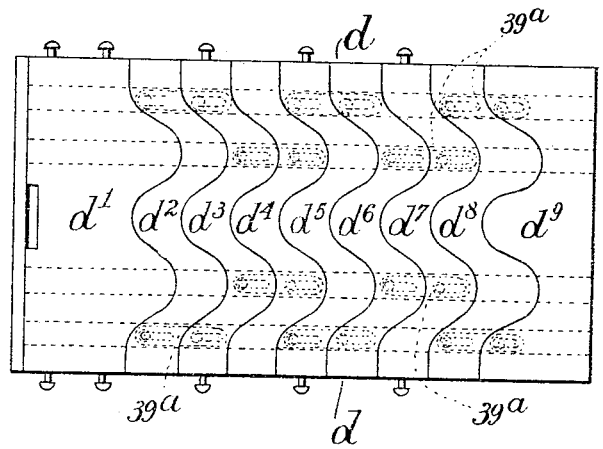
Figure 5:
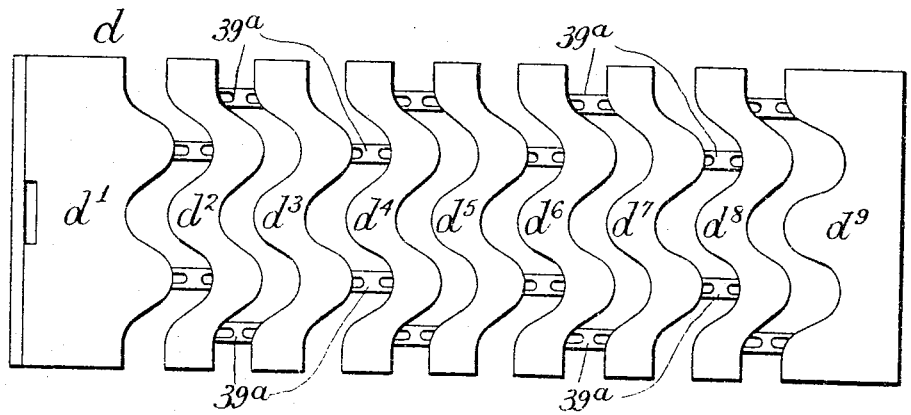

Fig. 2 is a sectional end elevation. Fig. 3 is a plan view. Figs. 4 and 5 are plan views of the "abutment" bars in the "closed" and "open" positions respectively. Fig. 6 is a plan view of the operative face of the "creaser" bars. Figs. 7, 8, 9 and 10 illustrate diagrammatically the progressive stages of the plaiting operation; Fig. 10 being drawn to a slightly enlarged scale. Figs. 11 and 11^A show in side elevation a machine for operating upon a continuous web of the material. Fig. 12 is an elevation of the delivery end of the machine of Figs. 11 and 11^A, and Fig. 13 is a similar view taken upon the line A—A of Fig. 11. Figs. 14 to 27 are drawn to an enlarged scale. Fig. 14 is a side elevation of one of the successive series of "creaser" bars and of the mutually opposed co-acting series of "abutment bars", both series being shown in the normal extended position. Fig. 15 is a view similar to Fig. 14 but showing the bars in the closed or operative position. Fig. 16 is a view of the bars shown at the right hand end of Fig. 14, but after having been traveled across the machine. Fig. 17 is a plan view of the abutment bars. Fig. 18 is a sectional plan view of parts of the right hand end of Fig. 14. Figs. 19 and 20 are longitudinal sections of two of the "creaser" bars. Fig. 21 is a sectional side elevation of one of the supporting or abutment bars. Fig. 22 is a detail view, in side elevation, of means for traveling the "creaser" and "abutment" bars. Fig. 23 is an end view of Fig. 22. Fig. 24 is an end elevation of a constructional detail of Fig. 22. Figs. 25, 26 and 27, are a side elevation, a cross section and a plan view, respectively, of means for receiving and subdividing the treated material. Figs. 28 and 29 show, in side elevation, two forms of paper manufactured in accordance with the invention.

Similar reference letters and numerals indicate corresponding parts in all the figures.

Referring to Figs. 1 to 10, 1 is the frame of the machine upon which a series of abutment bars $d$ is mounted said series $d$ being constituted by bars $d^1$, $d^2$, $d^3$, $d^4$, $d^5$, $d^6$, $d^7$, $d^8$, and $d^9$.

$c$ are the creaser bars comprising a series $c^1$, $c^2$, $c^3$, $c^4$, $c^5$, $c^6$, $c^7$, $c^8$, and $c^9$, respectively adapted to coincide with said abutment bars and provided at their ends with flanges adapted to slide within grooves formed in a frame C. The bars $c$ are loosely connected together by means of links $39^a$ engaging pins and serving to limit the extent of travel between successive bars when extended and said bars $c$ are provided with a flexible cable 47 passing therethrough and over suitably disposed pulleys 48 attached to the frame 1, and a pulley $h$ mounted upon a foot lever $i$, the free ends of said flexible cable being attached to the rearmost bar or block $c^1$ of the series $c$. The said rearmost bar or block $c^1$ of the series $c$ is connected by a cord to a spring 46 attached as shown to the framing 1 of the machine, and said bar or block is formed with a finger or lug 50 adapted to engage the rearmost abutment bar $d^1$ of the series $d$ in order to cause the two series of bars to move synchronously with one another when being brought to the closed position indicated in Figs. 4 and 6.

Above the series of creaser bars $c$ a platen or presser plate 7 carrying the aforesaid frame C is mounted upon guide rods and is adapted by means of springs $l$ to maintain the series of creaser bars and the series of abutment bars in close relationship with one another whereby to secure frictional contact between the coinciding creaser and abutment bars and the sheet of paper to be plaited. The said platen or pressure plate 7 is provided at top with a lever suitably connected to a pedal or foot lever $m$, whereby said platen 7 together with the series of creaser bars $c$ may be raised from the series of abutment bars $d$ sufficiently to permit of the insertion and removal from between said creaser and abutment bars of the work.

As is shown in Figs. 4 and 5 the abutment bars $d$ are of special configuration whereby to form sinuous or similar grooves or spaces transversely of the machine and thus prevent the admission into the grooves or spaces between said bars of the paper under treatment. The said bars $d$ are loosely connected together by links $39^a$ in a manner and for the purpose similar to that described with reference to the creaser bars $c$ and at their extremities said bars $d$ may be provided with guide pins engaging grooves in the machine frame 1.

The links $39^a$ connecting the creaser bars and abutment bars are removable and may be replaced by links of other length so that the distance separating consecutive bars may be varied in accordance with the depth of the plait required. Similarly the creaser bars and the abutment bars are removable for the purpose of inserting bars of other widths corresponding with such distances by which it may be required to separate consecutive plaits.

In operation pressure is first applied to the foot lever $m$ whereby to raise the platen or presser plate 7 and hence also the series of creaser bars $c$ sufficiently to permit the insertion of a sheet $a$ of paper or other fabric upon the series of abutment bars $d$, the creaser and abutment bars being in the normal extended positions as shown in Fig. 1. Pressure upon the foot lever $m$ is then released and the platen or presser plate 7 and with it the series of creaser bars $c$ is caused to descend by springs $l$ to bear firmly on the paper or other fabric $a$ upon the series of abutment bars $d$. Pressure is next applied to the foot lever $i$ and thereupon the series of creaser bars $c$ is contracted by the tension of the flexible cable which draws together the successive bars $c^1$ to $c^9$ constituting the series; the lug 50 thereon imparting corresponding motion to the series of abutment bars $d$ which thus moves synchronously with the series of creaser bars which latter by its movement expands the spring-controlled anchorage 46. By reason of the pressure between the coinciding creaser bars and abutment bars the paper or other fabric is held firmly between said bars at such parts whereat the creaser bars bear upon it as shown in Fig. 7 with the result that those parts of the paper whereat no pressure is exerted are caused upon and by the contraction of the series of creaser bars to become raised into the trough like spaces between said creaser bars $c$ as shown in Fig. 8. Further contraction of the creaser bars causes said raised or folded paper to become firmly gripped between the creaser bars the pressure applied thereby to the paper being such that the paper remains permanently creased or folded in the manner illustrated in the diagram Fig. 10. Pressure is then applied to the foot lever $m$ raising the platen 7 and series of creaser bars $c$ and pressure is released from the foot lever $i$, the creaser and abutment bars being returned to their respective normal extended positions by means of the spring controlled anchorage 46. The plaited sheet may then be withdrawn and a fresh sheet inserted for treatment.

In Figs. 11 to 29 a machine is illustrated which is capable of the continuous production of paper or other fabric having a succession of plaits, folds or projections separated by predetermined intervals, and permanently retained, if desired, after formation in their correct relative positions.

Referring particularly to Figs. 11, 11$^a$, 12 and 13, the paper or other fabric is treated between an intermittently driven endless band constituted by successive series of creaser bars, of exactly the same character as those described above, whereof each series is adapted to co-act in succession with a mutually opposed series of abutment bars or blocks to cause the paper or other fabric to become creased and plaited or folded. If desired an additional supporting or retaining sheet of paper or other fabric may be applied to the back of the plaited or folded material and the finished material may be reduced to the required dimensions. In this case the paper or other material to be treated is fed from a roller or like source of supply to and between the aforesaid intermittently driven endless band which is constituted by successive series of creaser bars whereof consecutive bars in each series are normally spaced apart, in the manner already described, by an amount equal to twice the height or depth of the fold or projection to be formed, and said consecutive bars are adapted to be traveled to bring their adjacent faces into contact with one another and operate upon the paper in the manner already described. These intermittently driven creaser bars are adapted to co-act with a mutually opposed relatively stationary series of abutment bars correspondingly normally spaced apart but provided with means for preventing the paper or other fabric from entering said spaces and capable of being similarly traveled. The paper or other fabric to be treated is supported upon said abutment bars and said abutment bars are adapted to be moved bodily toward that series of creaser bars for the time being coincident therewith until the paper is tightly gripped between said coinciding series of bars; the length of paper confined therebetween being severed by appropriate means as the two coinciding series of bars meet. The paper is then folded or plaited in the manner already described and the abutment bars are moved bodily away from contact with the now plaited and folded paper and the creaser bars still retaining the folded paper are fed forward to permit of the next successive series coming into operation and to permit, if desired, of the application to the under-side of the plaited paper of an adhesive sheet of plain paper whereby the inner abutting surfaces of each projection or fold may be caused to remain permanently in contact with one another and whereby the correct relative positions of the successive projections may be maintained.

Referring to Figs. 11, 11$^a$, 12 and 13, 1 indicates the main framing of the apparatus whereon a roll of paper to be treated $a$ and a roll of "backing" or supporting paper $b$ are mounted upon spindles carried in suitable bearings. The web of paper to be treated $a$ is led over a suitably faced guide roll 2$^a$ which may be fitted with a check spring (not shown) or other suitable means for controlling the rate of feed of the web, and from said roll 2$^a$ the web $a$ is led to and between the means for producing the creases and plaits or folds therein. This means consists of an intermittently-driven endless band constituted by successive series of bars $c$ whereof consecutive bars in each series are normally spaced apart by an amount equal to twice the height or depth of the projection to be formed in the paper; said creaser bars in each series being adapted to be traveled or slid so as to bring their adjacent faces or edges into approximate contact with one another. The creaser bars $c$ are mounted upon a pair or other suitable number of endless steel or other tapes 2, the endless band being passed around rollers 3, 3, adjustably mounted at the opposite ends of the upper part of the frame 1; guide rods 4, 4, 5, 5, suitably supported upon the frame 1 being provided whereby to prevent sagging of the endless band. A relatively stationary series of abutment bars $d$ is mounted within guideways 6 formed upon a platen 7 connected by means of compensating levers 8 to adjustable lifting rods 9, 9, provided at their lower extremities with antifriction rollers 10, 10, said rods 9, 9, passing through guides 11, 11, formed upon the frame 1. Upon a counter shaft $e$ geared to the main driving shaft $f$ there are mounted two cams 12, 12, adapted to operate said lifting rods 9, 9, whereby to alternately raise and lower the platen 7. The web of paper $b$ forming the backing sheet is led from its roller over freely revoluble guide rollers 13 mounted upon the frame 1, and a gumming roller 14 mounted adjacent to a receptacle 15 for the adhesive rotates in contact with the surface of said web of paper $b$ as shown in Fig. 11. From said guide rollers 13 the web of adhesive paper passes to a saddle 16 suspended from the framework 1 by means of springs, and becomes applied to the underside of the plaited paper, whereafter the "compound" sheet passes to a guide plate 17 whereby it is directed between pressure rollers 18, 18, for the purpose of folding over the projections or plaits in order to reduce the bulk of the finished article for storage purposes. From said pressure rollers 18, 18, the finished paper is led away from the machine by a conveyer 19 and, if desired may be severed into any required dimensions by means of adjustably mounted rotary knives 20.

Upon the main driving shaft $f$ a pinion 21 is keyed which meshes with a pinion 22 keyed to the countershaft $e$, and upon said countershaft $e$ cams 23, 23, are mounted each of which engages with and actuates a pivoted lever 24 connected by means of a slotted link 25 to a pivotally mounted driving lever 26 adapted to impart intermittent reciprocating movement to rods 27 whereon are mounted the means for traveling the creaser bars $c$ and abutment bars $d$. A slotted slideway 28 serving as a guide for and also to limit the extent of the forward angular movement of the lever 24 is attached to the framing 1.

29 is the main driving pulley mounted on the shaft $f$ and which is driven by means of a belt from any suitable source. 30 is a pulley, also mounted upon the shaft $f$, which is connected by means of a belt and rotates a pulley 31 keyed upon a shaft 32 and is adapted to drive rollers 18, 18.

33 is a pulley mounted upon shaft 32 and connected by means of a belt to a pulley 34 serving to rotate the knives 20, 20. 35 is a pulley also mounted upon shaft 32 and connected by a belt to a pulley 36 driving the conveyer 19.

37 is the fly wheel of the machine.

Referring to Figs. 14 to 21 inclusive, each series $c$ of creaser bars is constituted by (say) nine independent rectangular bars $c^1$, $c^2$, $c^3$, $c^4$, $c^5$, $c^6$, $c^7$, $c^8$, $c^9$, threaded upon a pair of endless flat steel ribbons or tapes 2, 2, and whereof the bars $c^2$ of each series is rigidly attached by set-screws 38, 38, to the tapes 2, 2; the remaining bars being slidably mounted thereon by passage of the tapes through ways formed in each bar as shown. Suitable apertures are also formed in said bars for the passage therethrough of the guide rods 4, 4, and 5, 5. In order to limit the extent of the spaces separating consecutive bars when in the normal or extended position, as shown in Fig. 14, an adjustable flexible wire or other connection 39 (Fig. 18) is provided between successive bars, the length of such wire being regulated in accordance with the measure of the paper desired in each fold. Similar flexible connections $39^a$ (Figs. 17 and 21) are provided between the abutment bars $d$ whereby the extent of movement of said bars may coincide with that of the bars of each series $c$. When the bars $c^1$ to $c^9$ of a series are traveled into approximate contact with one another whereby to plait or fold the paper said bars are adapted to become interlocked by means of the engagement of the inclined and recessed noses or latches 40 with the spring-controlled lugs or bolts 41, as shown in Fig. 15. Pins 42 projecting through slots formed in the end walls of the bars $c^1$ to $c^9$ of each series are successively adapted to engage an inclined projection 43 formed upon or attached to the frame 1 whereby the lugs or bolts 41 become released from the latches 40. Upon the aforesaid release of the bolts 41 from the latches 42 leaf or other suitable springs 44 return the bars $c^1$ to $c^9$ in succession to their normal extended positions. In addition to the adjustable flexible connections $39^a$ the area wherever the abutment bars $d$ may be extended is adapted to be regulated by means of stops 45, 45, mounted adjustably upon the guideways 6, 6, formed upon the platen 7, by means of bolts passing through longitudinal slots in said stops, not shown, but as will be well understood.

The series of abutment bars $d$ comprises (say) ten independent flexibly connected bars $d^1$, $d^2$, $d^3$, $d^4$, $d^5$, $d^6$, $d^7$, $d^8$, $d^9$, $d^{10}$, whereof the bars $d^1$ to $d^8$ are respectively adapted to coincide with the bars $c^2$ to $c^9$ of that series $c$ for the time being in operation the bar $d^1$ being removably attached to stop 45; the bars $d^9$ and $d^{10}$ coinciding and co-acting with the creaser bars $c^1$ and $c^2$ of the next succeeding series for a purpose hereafter to be referred to, the bar $d^{10}$ being removably attached to the adjacent adjustable stop 45. In order that said abutment bars $d^1$ to $d^8$ may be returned to the normal extended position on completion of each folding or plaiting operation by the successive series of creaser bars $c$ a weight 46 is suspended by a cable 47 attached to said bar $d^8$ and passing freely through bars $d^9$ and $d^{10}$ and over a pulley 48, or if desired suitable springs may be substituted therefor, and, in order to relieve the flexible connections between the bars $d^1$ to $d^8$ of excessive strain when said bars are returned to the normal extended position by the weight or otherwise, a stop (not shown) similar to the aforesaid adjustable stops 45, may if desired be attached to the platen to arrest the bar $d^8$. The bar $d^9$ is returned at the required time to the normal extended position by means of leaf springs 49, the bar $d^{10}$ always remaining stationary thereto.

If desired the interlocking of the bars may be rendered more complete by the provision of dowels or pegs 50 and corresponding recesses 51.

For the purpose of insuring the requisite frictional contact between the mutually opposed faces of the creaser and abutment bars and the paper to be or being treated, the faces of said creaser bars $c$ and abutment bars $d$ are provided with surface plates 52 and 53, respectively, of vulcanite or other suitable material, the plates 53 being of special configuration whereby to form sinuous channels transversely of the machine when the bars are extended and adapted to interlock with one another so as to prevent the paper from entering the spaces separating the bars $d$.

Upon the abutment bar $d^8$ is attached a knife 54 whereby the length of paper for the time being under treatment between the creaser and abutment plates is severed from the web or main supply.

Fig. 11$^A$, and Figs. 22, 23 and 24 illustrate the means whereby the web of paper $a$ issuing from the feed roll is drawn into the machine for treatment, the means whereby the creaser and abutment bars are simultaneously traveled or closed so as to operate upon the paper, and the means for intermittently driving forward the successive series of creaser bars.

When the length of paper for the time being under treatment between the creaser and abutment bars is severed from the web or main supply the free extremity of the web is retained by the creaser bars $c^1$ and $c^2$ of the next successive and for the time being inoperative series of creaser bars, said two bars co-acting with the abutment bars $d^9$ and $d^{10}$.

At each side of the machine and mounted upon the platen 7 are inclined cam projections 55 (see Figs. 22, 23 and 24) each having a depending screw threaded sleeve or extension passing through a longitudinal slot in the platen and embracing screw threaded rods 56. The rods 56 are provided at their outer extremities with bevel wheels 57 (see Fig. 24) engaging bevel wheels 58 mounted upon a transverse rod 59 carried in bearings 60 and operated by a hand wheel 61. By this means the inclined cam projections 55 may be adjusted longitudinally of the platen 7.

Upon each rod 27 a bracket is keyed having a boss 62 and provided integrally therewith with an upwardly projecting arm 63 and with a horizontally disposed boss 64 through which the shank or spindle 65 of a shoe 66 loosely passes being keyed therein against angular movement by means of a key 67. A collar 68 is made fast to the upper extremity of said spindle 65 and a spring 69 encircling the spindle 65 is confined between the shoe 66 and said horizontally disposed boss 64. The upper arm 63 is provided with a latch or bolt 70 controlled by a suitable spring (not shown) and the shoe 66 is similarly provided with a spring controlled latch or bolt 71, said latches or bolts being adapted during the forward movement of the rods 27 to engage lugs or projections 72, 73, formed upon the bars $c^9$ and $d^8$ respectively so as to travel or close the two operative series of bars.

On the completion of the simultaneous travel from the normal extended to the closed position of said operating series of creaser bars and coinciding abutment bars the lowermost bolts or latches 71 engaging the stops 73 of bar $d^8$ become disengaged from said stops by the descent of the platen thus permitting the uppermost bolts or latches 70, which continue to be carried forward by rods 27 to cause the operating series of creaser bars $c$ to be fed forward. After having been fed forward a short distance said operating series of creaser bars $c$ carry the creased paper on to the spring suspended saddle 16 over which the adhesive backing paper $b$ passes, the pressure exerted by said saddle causing the application to the underside of the plaited paper of said adhesive backing $b$.

In their forward movement over the saddle 16 the creaser bars encounter a projection 74 formed upon a spring-controlled knife 75 adapted to operate through a slot 76 formed in said saddle as shown. The pressure of the creaser bars $c$ upon said projection 74 causes the knife 75 to be retracted below the surface of the saddle 16 during the passage over the saddle of the series of creaser bars, and as soon as the rearmost of said bars has passed over the projection 74 pressure thereon is released and the knife 75 is instantaneously forced by means of its spring upwardly through the slot 76 and severs the backing paper *b* adhering to the creased sheet. Spring clips 77 are attached to the saddle 16 for the purpose of retaining the web of adhesive paper thereon until the next succeeding series of creaser bars is driven forward and brings the underside of the next sheet of creased paper into contact therewith.

The operation of the machine is as follows:—Assuming a fresh roll of paper to be treated to be in position and also assuming a series of creaser bars *c* to be situated in the normally extended position above the also normally extended abutment bars on the platen. The web of paper to be treated *a* is introduced by hand over the guide roll $2^a$ and is passed through the machine over the surface of the abutment bars *d* whereon said paper rests. At this stage the platen 7 is in its lowermost position and the cams 12, 12, 23, 23, are in the normal or inoperative positions. The driving shaft *f* is slowly rotated by hand in the direction of the arrow indicated thereon in Fig. $11^A$ causing the cams 12, 12, to be moved angularly so as to engage the anti-friction rolls and raise the platen 7 until the abutment bars *d* and coinciding creaser bars *c* grip the paper to be treated between them; the knife 54 simultaneously severing the length of paper to be treated from the web. The rods 27 are at the same time given a sharp movement to the right, by hand, by moving the levers 26 angularly in that direction, having for effect to carry the brackets and arms 63 and shoes 66 along and to cause said shoes 66 to engage and ride up the inclined cam projections 55 to come into contact with lugs $72^a$ upon the bar $d^9$ and to shift both the bar $d^9$ and its coinciding and co-acting bar $c^1$ back toward the bars $c^2$ and $d^{10}$, so as to grip, fold and retain the severed extremity of the web of paper issuing from the roll. The machine is then set in operation by means of the driving belt and pulley 29 and the rotating pinions 21, 22, cause countershaft *e* to rotate and thereby impart angular movement to the cams 12, 12, and 23, 23. Said cams 23, 23, in their rotation approach and contact with levers 24, 24, connected by links 25 to the driving levers 26 and impart angular movement to said levers and a forward movement to the rods 27, and during said forward movement the spring-controlled stops 70, 71, meet the projections 72, 73, upon the rearmost creaser bar $c^9$ of the for the time being operative series, and abutment bar $d^8$ respectively, and travel said bars toward the opposite end of the machine causing those parts of the paper whereon no pressure is exerted by the coinciding series of creaser and abutment bars to become doubled or folded into the gradually diminishing spaces intervening between successive creaser bars, the surface plates 53 of the abutment bars preventing misdirection of the doubled or folded parts as already explained. When the full extent of travel of the said bars has been attained the creaser bars become interlocked with one another as already explained and tightly grip the creased and doubled or folded paper between them so that the sheet is formed with a series of upstanding parallel transverse projections. The platen 7 now commences to descend disengaging the lugs 71 and stops 73 and by the continued forward movement of the rods 27 the aforesaid closed series of creaser bars is driven forward and the next succeeding series is brought into the machine in the normal or extended position, the extremity of the web of paper to be treated being gripped between the leading bars $c^1$, $c^2$, as already described by the return stroke of the rods 27 which is caused by a suitable coiled spring (not shown) surrounding each rod and confined between a collar thereon and the frame of the machine. Simultaneously with the closing together of said next succeeding series of creaser bars the already closed bars of the series in advance are again driven forward on to the saddle 16 upon which the web of adhesive backing or retaining paper is supported. The contact of the underside of the creased and plaited paper carried by said closed creaser bars with the adhesive backing paper and the upward pressure of said spring-controlled saddle 16 effects the application of said backing paper to the underside of the plaited or folded paper. On the further forward movement of the sheet of now compound material, and as the rearmost creaser bar of the series releases the projection 74, the knife 75 instantaneously rises and severs the web of backing paper along the rear edge of said compound sheet. As said creaser bars leave the saddle 16 the spring-controlled bolts 42 engage in succession and ride up the inclined projection 43 whereby said bolts become disengaged from the latches 40 and the creaser bars become returned in succession to the normal extended position by means of the springs 44.

The plaited or folded sheet of paper on becoming released from between the creaser bars passes to and between a pair of pressure rollers 18 whereby the upstanding projections are folded over for the purpose of reducing the bulk of the finished article for storage purposes. From said pressure rollers 18 the finished paper is led away from the machine by a conveyer 19, and, if desired, may be severed into any desired number of smaller sheets by means of a suitable number of adjustably mounted rotary or other knives such as 20.

In the machine described and illustrated the creaser bars are adapted to exert pressure throughout the entire height of each projection or plait with the result that a tightly-pressed fold is produced. It may, however, be desired to obtain projections or plaits having a somewhat elastic form at their upper extremities in order to lightly retain the rows of packed articles, and to this end the surface plates 52 of the creaser bars may be formed of a slightly greater width than the bodies of the bars so that when the paper is plaited pressure is applied only over the areas covered by the edges of said surface plates, or for a relatively short distance vertically of each plait or projection, as shown in Fig. 29, and in such a case the pressure roller 18 would of course be omitted. Again, instead of providing the sheet of paper with uniformly spaced projections, or folds as shown in Figs. 10, 28 or 29, it may be desired to obtain irregularly spaced projections, in which case the surface plates of the creaser and abutment bars or the creaser and abutment bars themselves would be of correspondingly irregular widths, the necessary consequential adjustments in the apparatus being made. Further, instead of producing the compound material in sheets, the machine may be adapted to supply a continuous length of creased, plaited or folded paper strengthened with or without the backing sheet as described; the knives 54 and 75 being for this purpose removed and the finished paper being continuously wound from the machine onto a storage drum or roller and being cut into sheets of the desired sizes when required for use.

In some cases it may be necessary to completely isolate from one another successive packed articles in each row, and for this purpose strips of the compound material may be cut and laid between the troughs formed between the successive upstanding projections or partitions upon the packing sheet; said narrow strips corresponding in width to the respective troughs and the projections thereon being disposed at right angles to the aforesaid projections upon the packing sheet so as to form therewith pockets for the reception of the articles. In this manner the individual articles may be completely isolated from one another and in addition, a more secure form of packing is obtained by reason of the mutual support afforded by the abutting upstanding partitions.

By means of the above described apparatus absolute economy during manufacture is attained; the plaited or folded paper being formed and the adhesive backing applied thereto without any waste of material whatever.

What I claim is:—

1. Apparatus for producing plaited paper for packing and like purposes, comprising two series of spaced bars adapted to co-act with one another to first simultaneously grip predetermined areas of the material between their mutually opposed faces, means for thereafter traveling said bars to close them and cause adjacent edges of said gripped parts of the material to meet, one of said series of bars having means for causing the material intervening between adjacent edges of said gripped parts and whereon no pressure is applied initially to become automatically folded, as the bars close, in the spaces separating adjacent bars of the other series whereby the sheet of material is formed at one side with a series of spaced plaits or folds alternating with plane areas.

2. Apparatus for continuously producing sheets of plaited paper for packing and like purposes comprising successive series of spaced bars adapted to co-act in succession with another series of spaced bars to simultaneously grip predetermined areas of successive lengths of the material between their mutually opposed faces, means for traveling said bars to close them and cause adjacent edges of said gripped parts of the material to meet, one of said series of bars having means for causing the material intervening between adjacent edges of said gripped parts and whereon no pressure is applied initially to become automatically folded, as the bars close, in the spaces separating adjacent bars of the other series whereby the sheet of material is formed at one side with a series of spaced plaits or folds alternating with plane areas, means for locking together said adjacent bars, and means for releasing said adjacent bars whereby to permit of the withdrawal from the machine of the plaited article.

3. Apparatus for continuously producing sheets of plaited paper for packing and like purposes comprising successive series of spaced bars adapted to co-act in succession with another series of spaced bars to simultaneously grip predetermined areas of successive lengths of the material between their mutually opposed faces, means for traveling said bars to close them and cause adjacent edges of said gripped parts of the material to meet, one of said series of bars having means for causing the material intervening between adjacent edges of said gripped parts and whereon no pressure is applied initially to become automatically folded, as the bars close, in the spaces separating adjacent bars of one series whereby the material is formed at one side with a series of spaced plaits or folds alternating with plane areas, means for locking together said adjacent bars, means for further traveling one series of bars, means to cause the application to the underside of each of said lengths of plaited material of an additional backing sheet whereby to hold said meeting adjacent edges to permanently retain the correct relative positions of the folds, and means for releasing said adjacent bars to permit the withdrawal from the machine of the plaited article.

4. Apparatus for producing plaited paper for packing and like purposes, comprising a series of loosely connected spaced creaser bars and a series of loosely connected spaced abutment bars, the bars of each series being separated by a distance equal to twice the height of a plait and being adapted to simultaneously grip predetermined areas of the paper between their mutually opposed faces, and means for simultaneously traveling both series of bars to close them and cause adjacent edges of the gripped parts of the paper to meet, said series of abutment bars having means for causing the paper intervening between adjacent edges of said gripped parts and whereon no pressure is applied initially to become automatically folded and gripped between successive creaser bars.

5. Apparatus for continuously producing plaited paper for packing and like purposes, comprising an intermittently movable endless band constituted by successive series of spaced bars, a mutually opposed series of spaced bars with which each series of the endless band is adapted to co-act in succession to simultaneously grip predetermined areas of several lengths of paper, means for traveling said co-acting bars to close them and cause adjacent edges of the gripped parts of the paper to meet, one of said series of bars having means for causing the material intervening between adjacent edges of said gripped parts and whereon no pressure is applied initially to become automatically folded as the bars of such series close between adjacent bars of said intermittently movable series, means for locking together the bars of the closed series, and means for releasing the bars of the closed series.

6. Apparatus for continuously producing plaited paper for packing and like purposes, comprising an intermittently driven endless band constituted by successive series of spaced bars, a mutually opposed series of spaced bars with which each series of the endless band is adapted to co-act in succession to simultaneously grip predetermined areas of severed lengths of paper, means for traveling said co-acting bars so as to close them and cause adjacent edges of the gripped parts of the paper to meet, one of said series of bars having means for causing the material whereon no pressure is applied initially to become automatically folded between adjacent bars of said intermittently driven series, means for locking together the closed bars of the intermittently driven series, a resiliently mounted saddle whereby on a farther travel of the closed bars to cause the application to the underside of said plaited paper of an adhesive backing sheet to hold said meeting adjacent edges whereby to permanently retain the correct relative positions of the plaits, means for severing the required length of said backing sheet, means for releasing said closed bars, and means for extending same to permit of the withdrawal from the apparatus of the plaited article.

7. Apparatus for producing plaited paper for packing and like purposes comprising the combination of an intermittently driven endless band constituted by successive series of spaced creaser bars, a relatively stationary series of spaced abutment bars, a platen adapted to travel said series of abutment bars toward and from each series of creaser bars, means for severing the paper to be treated from the web, and means whereby to simultaneously travel the creaser and abutment bars to close them whereby to plait the paper.

8. Apparatus for producing plaited paper for packing and like purposes comprising the combination of an intermittently driven endless band constituted by successive series of spaced creaser bars, a relatively stationary series of spaced abutment bars, a platen adapted to travel said series of abutment bars toward and from each series of creaser bars, means for severing the paper to be treated from the web, means whereby to simultaneously travel the creaser and abutment bars to close them whereby to plait the paper, and means whereby to effect the application to said plaited paper of a backing sheet of corresponding length.

In testimony whereof I have hereunto set my hand in presence of two subscribing witnesses.

CHRISTIAN ROBERT HEISER.

Witnesses:
  CHARLES JOHNSON,
  HARRY J. STOYDEN.